US009386405B2

(12) United States Patent
Velusamy et al.

(10) Patent No.: US 9,386,405 B2
(45) Date of Patent: Jul. 5, 2016

(54) LOCATION-BASED PROFILES (71) Applicant: T-Mobile USA, Inc., Bellevue, WA (US)

(72) Inventors: Senthil Kumar Mulluppadi Velusamy, Bellevue, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 92 days.

(21) Appl. No.: 13/802,170

(22) Filed: Mar. 13, 2013

(65) Prior Publication Data

US 2014/0057589 A1    Feb. 27, 2014

Related U.S. Application Data (60) Provisional application No. 61/693,256, filed on Aug. 25, 2012.

(51) Int. Cl.
H04W 4/02        (2009.01)
H04W 4/00        (2009.01)

(52) U.S. Cl.
CPC ............... *H04W 4/02* (2013.01); *H04W 4/001* (2013.01)

(58) Field of Classification Search
CPC ................................ H04W 4/02; H04W 4/001
USPC ........ 455/456.1–457, 452.2, 450, 451, 452.1, 455/404.2; 342/451; 370/338
See application file for complete search history.

(56) References Cited

U.S. PATENT DOCUMENTS

| | | | | |
|---|---|---|---|---|
| 7,181,192 | B2* | 2/2007 | Panasik | H04M 1/72538 340/436 |
| 7,912,187 | B1* | 3/2011 | Mikan | H04L 12/5815 379/88.14 |
| 8,260,266 | B1* | 9/2012 | Amidon | H04M 3/42348 455/414.1 |
| 2005/0221808 | A1* | 10/2005 | Karlsson | H04M 1/72563 455/418 |
| 2012/0275442 | A1* | 11/2012 | Malets | H04W 4/16 370/338 |
| 2012/0284527 | A1* | 11/2012 | Nagpal et al. | 713/189 |
| 2012/0323687 | A1* | 12/2012 | Schuster | G06Q 30/02 705/14.57 |
| 2012/0323909 | A1* | 12/2012 | Behforooz | G06F 17/3053 707/728 |
| 2013/0093627 | A1* | 4/2013 | Cosman | 342/451 |
| 2014/0095406 | A1* | 4/2014 | Wynn | H04W 12/08 705/347 |

\* cited by examiner

*Primary Examiner* — Sharad Rampuria
*Assistant Examiner* — Farideh Madani
(74) *Attorney, Agent, or Firm* — Lee & Hayes, PLLC (57) ABSTRACT

A computing device may be used in multiple locations. One or more networks may be available at each of the multiple locations. A profile may be created and associated with at least some of the multiple locations. The profile may specify a configuration of the computing device, such as which network to connect to at a particular location. When the computing device is located in a location that has an associated profile, the profile may be used to configure the computing device, including connecting the computing device to at least one network that is available at the location. The profile associated with the location may include information for connecting the computing device to the at least one network.

18 Claims, 5 Drawing Sheets

LOCATION-BASED PROFILES

RELATED APPLICATIONS

This application claims priority to U.S. provisional patent application No. 61/693,256, entitled "Profile Driven Geolocation and Network Connectivity" and filed on Aug. 25, 2012. Application No. 61/693,256 is fully incorporated herein by this reference.

BACKGROUND

Mobile devices, such as smart-phones and laptops, may have the ability to connect to different types of communications networks. For example, a mobile device may be capable of connecting to a cellular network, a WiFi network, an Ethernet network, and the like. Because a mobile device is mobile and may move from one location to another location, the number and types of networks may vary based on the location. For example, in a particular location, a first network may be available, a second network may be unavailable, while a third network may have poor coverage. Accordingly, a user of a mobile device may choose which network to use based on various criteria, such as connectivity speed, signal strength, security, and the like. To connect to a particular network from the networks available at a particular location, the user may manually configure a connection to the particular network. However, configuring the connection may be a time-consuming process, particularly on limited form factor devices, such as a mobile phone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques to create and use location-based profiles for mobile devices. The location-based profiles may be used to perform location-specific configuration of a mobile device. For example, one or more processors of the mobile device may automatically (e.g., without human interaction) configure the mobile device based on a first profile when the mobile device is located in a first location. The one or more processors may automatically configure the mobile device based on a second profile when the mobile device is located in a second location, and so on.

Based on location, a user may have access to one or more networks, such as a first cellular network (e.g., from a service provider), other cellular networks (e.g., from roaming partners of the service provider), a home WiFi network located in the user's home, a work WiFi network at the user's place of employment, a public WiFi network in a coffee shop or library, or any combination thereof. When the mobile device accesses a particular network at a particular location, the user may configure the mobile device and save a profile corresponding to the configuration. For example, when the user connects to a WiFi network at a particular location, the profile may include connectivity related information and non-connectivity related information. The connectivity related information may include information associated with connecting to the WiFi network, such as a service set identifier (SSID) of the WiFi network, a password or other credentials (if required) to access the WiFi network, etc. The non-connectivity related information may include which applications to enable and/or disable (e.g., disable electronic commerce applications when using an unsecure WiFi network), enhanced 911 (E911) information, whether to activate a notification to let friends know that the user is at the location, etc. The connectivity-related information that is stored in the profile may be based on the particular network to which the mobile device is connecting. For example, when connecting to a WiFi network, WiFi-related connectivity information may be stored in the profile and when connecting to a cellular network, cellular-related connectivity information may be stored in the profile.

After the profile associated with a location has been saved, the user may select a previously saved profile or the mobile device may automatically determine when the mobile device is located at the location, retrieve the corresponding profile, and configure the mobile device based on the profile. The mobile device may automatically determine when the mobile device is located at the location based on information, such as a current time and date (e.g., from Monday to Friday, between 9:00 AM to 5:00 PM, connect to the work WiFi network), location information (e.g., provided by positioning satellites, cell tower triangulation, a domain name system (DNS) server, or the like), other information, or any combination thereof.

Thus, when a profile is activated, the mobile device may automatically connect to a particular network, the mobile device may be automatically configured, and specific information may be provided to the user and/or to applications executing on the mobile device. The profile may be activated in various ways, such as manually, in response to the user selecting the profile, automatically, by the mobile device, or a combination of both. For example, the profile may be automatically activated in response to determining that a current time and date is within a predetermined time and date or in response to determining that the mobile device is located at a specified location.

In some cases, a profile may be activated by a combination of automatic location determination and manual interaction. For example, the mobile device may determine a location of the mobile device and determine that several profiles are associated with the location. To illustrate, a user may frequent a coffee shop that is in close proximity to the user's work place. For example, the coffee shop maybe located on a first floor of a building and the workplace located on a second floor of the same building. As another example, the coffee shop maybe located in a first building that is adjacent to a second building that includes the user's workplace. In such a situation, the location information may be insufficient to enable the mobile device to distinguish between the coffee shop and the workplace. In other words, the location information may place both the coffee shop and the workplace at approximately the same location. The mobile device may retrieve profiles associated with the location, display the profiles, receive a user selection of one of the displayed profiles, and configure the mobile device based on the profile selected by the user.

Thus, a user may create and store profiles for configuring a mobile device based on a location of the mobile device. The mobile device may be configured based on (i) a previously stored profile in response to the user selecting the previously stored profile, (ii) in response to the mobile device determining a location of the mobile device and retrieving a corresponding profile based on the location, or (iii) in response to the user selecting from multiple profiles corresponding to the location after the mobile device determines the location of the mobile device and retrieves the multiple profiles based on the location. For example, the user may configure the mobile device when the mobile device is located at a first location and store a first profile. The user may configure the mobile device when the mobile device is located at a second location and store a second profile. Subsequently, when the mobile device determines that the mobile device is located at the first location, the mobile device may automatically configure the mobile device based on the first profile. For example, the first profile may configure the mobile device to connect to a first network (e.g., a first cellular network or a first WiFi network). When the mobile device determines that the mobile device is located at the second location, the mobile device may automatically configure the mobile device based on the second profile. For example, the second profile may configure the mobile device to connect to a second network (e.g., a second cellular network or a second WiFi network).

Figure 1:
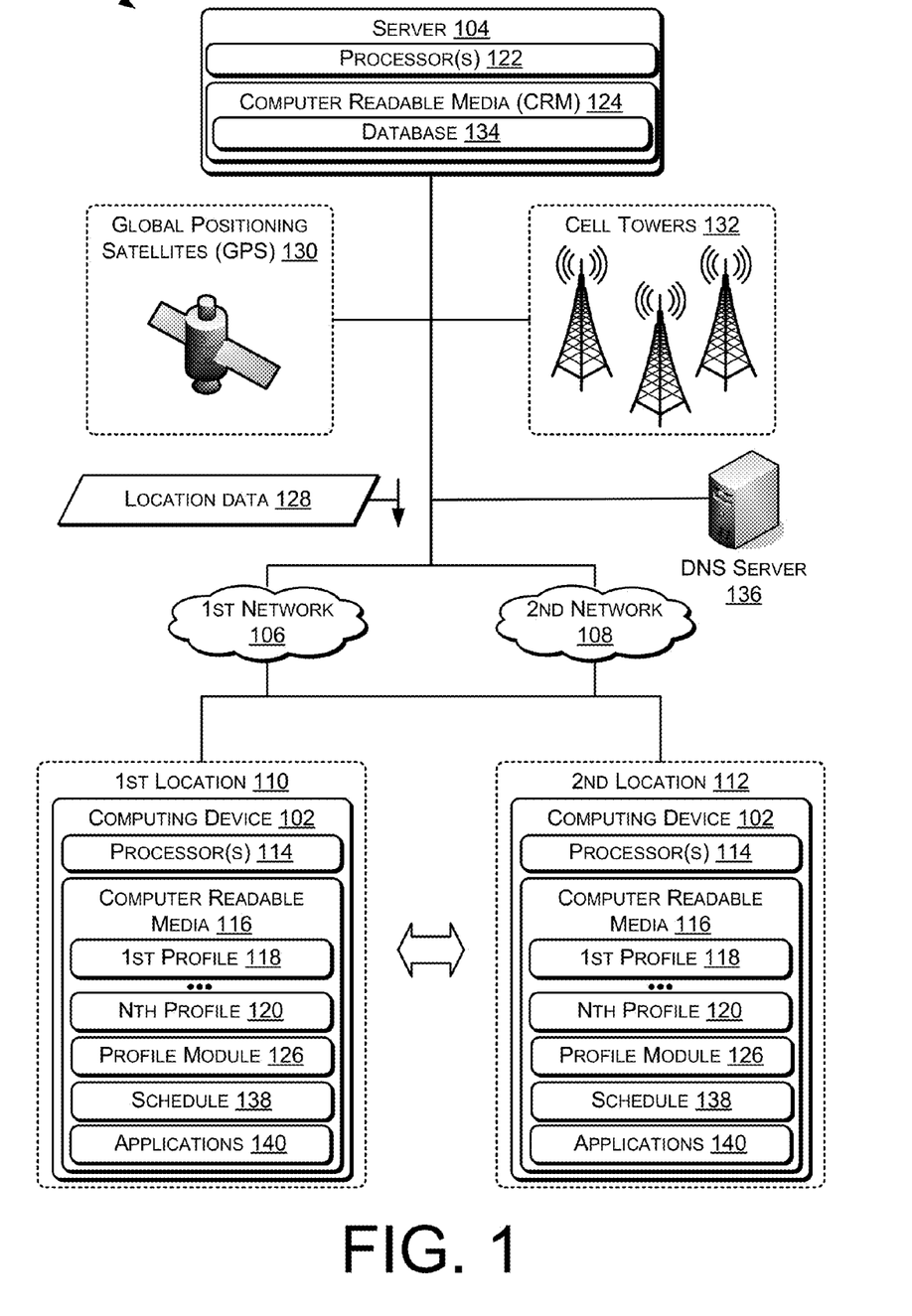
FIG. 1 is a block diagram illustrating a system for using location based profiles according to some implementations.

FIG. 1 is a block diagram illustrating a system 100 for using location based profiles according to some implementations. The system 100 includes a computing device 102 coupled to a server 104 by at least a first network 106 or a second network 108. While two networks are illustrated in FIG. 1, additional networks may be available to which the computing device 102 may connect. The computing device 102 may be a mobile device that can be moved to different locations, such as a first location 110 or a second location 112. While two locations are illustrated in FIG. 1, a user may use the computing device 102 in more than two locations. For example, the locations where the computing device 102 is used may include the user's home, the user's place of work, shops (e.g., restaurants) that the user frequents, the homes of friends or relatives, etc.

The computing device 102 may include one or more processors 114 and a computer readable media 116. The computer readable media 116 may be used to store one or more profiles. As illustrated in FIG. 1, the computer readable media 116 may be used to store N profiles (where N>1), including a first profile 118 to an Nth profile 120. In some cases, at least some of the N profiles 118 to 120 may be stored on a remote server (e.g., using a cloud-based service), such as the server 104, instead of or in addition to being stored on the computing device 102. The computer readable media 116 may be used to store software instructions, such as device drivers, an operating system, etc. that are executable by the processors 114 to perform various functions. The computing device 102 may additionally have other types of computer-readable media, including removable devices such as hard disks, solid state drives (SSDs), optical disks (e.g., compact disc or digital versatile disc), memory cards, and so forth. While a representative computing device (e.g., the computing device 102) is illustrated in FIG. 1, in a typical implementation, multiple computing devices may be communicatively coupled to the server 104 using each of the networks 106 or 108.

The server 104 may include one or more processors 122 and one or more computer readable media 124. The computer readable media 124 may be used to store software instructions, such as device drivers, an operating system, and applications, that are executable by the processors 122 to perform various functions.

To enable the computing device 102 to be automatically configured when the computing device 102 is located at the first location 110, the user may create and save a profile, such as the first profile 118, and associate the first profile 118 with the first location 110. At least a portion of the information in the first profile 118 may be manually entered by the user, auto-populated based on a current configuration of the computing device 102, or a combination of both.

For example, the user may use a profile module 126 to create the first profile 118 and enter information (e.g., connectivity related information and non-connectivity related information) associated with the configuration of the computing device 102 at the location 110. The connectivity information may include a communications mode (e.g., cellular or WiFi), a network identifier (e.g., SSID), credentials (e.g., a username and/or password) to access the first network 106, other connectivity related information, or any combination thereof. The non-connectivity related information may include one or more applications to enable, one or more applications to disable, E911 information, whether to send a notification to a social network, other non-connectivity related information, or any combination thereof. The user may determine location data 128 associated with the first location 110, associate the first profile 118 with the first location 110, and store the first profile 118 in the computing device 102.

As another example, the user may configure the computing device 102 and then use the profile module 126 to create the first profile 118. The user may configure the computing device 102 to communicate using the first network 106 by entering connectivity related information, such as a communications mode (e.g., cellular mode or WiFi mode), a network identifier (e.g., SSID), a password or other form of credentials, other connectivity related information, or any combination thereof. The user may configure non-connectivity related features of the computing device 102. For example, the user specify one or more applications to enable, one or more applications to disable, E911 information, whether to send a notification to a social network, other non-connectivity related information, or any combination thereof. After the user has configured the computing device 102, the user may instruct the profile module 126 to create a profile corresponding to the first location 110. In response, the profile module 126 may automatically populate at least some portions of the first profile 118 based on a current configuration of the computing device 102. If the profile module 126 is unable to automatically populate portions of the first profile 118 based on the current configuration of the computing device 102, the profile module 126 may prompt the user to enter information to populate the portions of the first profile 118 that the profile module 126 was unable to determine.

The computing device 102 may determine the location data 128 of the first location 110 automatically, based on information (e.g., schedule information) input by the user, or a combination of both. For example, the computing device 102 may automatically determine the location data 128 using scheduling information provided by the user, global positioning satellites (GPS) 130, cell towers 132 (e.g., using triangulation or other location techniques), a database 134 that includes locations of public wireless access points, a domain name system (DNS) server 136, a schedule 138 that includes location information, another type of location information, or any combination thereof. In some cases, the computing device 102 may automatically determine the location data 128 using a combination of sources. For example, the computing device 102 may initially determine an approximation of the first location 110 based on the GPS 130 or the cell towers 132 and then refine the approximation using the database 134 and/or the DNS server 136. If the sources of the location data 128 (e.g., one or more of the GPS 130, the cell towers 132, the database 134, the DNS server 136, or the schedule 138) are unable to provide sufficient data to accurately determine a location of the computing device, the user may be prompted to enter the location data 128.

The user may create a profile for each location where the computing device 102 is used and/or each network that the computing device 102 is used to access. For example, the user may create the Nth profile 126 to be used to access the second network 108 at the second location 112. The Nth profile 126 may include configuration information associated with accessing the second network 108 at the second location 112.

After the user creates the N profiles 118 to 120, one or more of the N profiles 118 to 120 may be activated (e.g., triggered) based on a location of the computing device 102. The location of the computing device 102 may be determined based on the schedule 138 provided by the user, based on the location data 128, or a combination of both. In the schedule 138, the user may specify locations for specific time periods for specific days. For example, the user may specify that 7:00 AM to 8:00 AM, on weekdays (e.g., Monday thru Friday), the computing device 102 may be located in a coffee shop, from 8:00 AM to 5:00 PM on weekdays, the computing device 102 may be located in the user's place of employment, and from 5:00 PM to 8:00 AM on weekdays and all day on the weekend (e.g., Saturday and Sunday), the computing device 102 may be located in the user's home.

If the schedule 138 is not specified, or there are time periods in the schedule 138 for which locations are not specified, the computing device 102 may determine a location of the computing device 102 based on the location data 128. For example, the computing device 102 may determine the location data 128 (e.g., from the servers 104 or 136, the GPS 130, and/or the cell towers 132). The computing device 102 may determine that the computing device 102 is located at the first location 110 based on the location data 128. The computing device 102 may determine whether at least one of the N profiles 118 to 120 is associated with the first location 110. If the N profiles 118 to 120 are not associated with the first location 110, the profile module 126 may determine whether the user desires to create a new profile for the first location 110. If a single profile (e.g., the first profile 118) is associated with the first location 110, the computing device 102 may automatically retrieve the corresponding profile and automatically configure the computing device 102 based on the profile. For example, the computing device 102 may automatically retrieve the first profile 102 and automatically configure the computing device 102 based on the first profile 102 to connect to the first network 106.

If multiple profiles from the N profiles 118 to 120 are associated with the first location 110, the computing device 102 may automatically retrieve the multiple profiles and display the multiple profiles to the user. In response to the user selecting a particular profile from the multiple profiles, the computing device 102 may automatically configure the computing device based on the selected profile. For example, the computing device 102 may determine that the N profiles 118 to 120 are associated with the first location 110 and display a profile identifier (e.g., a profile name) associated with each of the N profiles 118 to 120. In response to the user selecting one of the N profiles 118 to 120, the computing device 102 may automatically configure the computing device 102 based on the selected profile (e.g., the Nth profile 120).

After the computing device 102 is moved, the computing device 102 may determine that the computing device 102 is located in the second location 112 based on the schedule 138 provided by the user, based on the location data 128, or a combination of both.

For example, the computing device 102 may determine the location data 128 from one or more of the servers 104 or 136, the GPS 130, or the cell towers 132. The computing device 102 may determine that the computing device 102 is located at the second location 112 based on the location data 128. The computing device 102 may determine whether at least one of the N profiles 118 to 120 is associated with the second location 112. If a single profile (e.g., the Nth profile 120) is associated with the second location 112, the computing device 102 may automatically retrieve the corresponding profile and automatically configure the computing device 102 based on the profile. If multiple profiles from the N profiles 118 to 120 are associated with the first location 110, the computing device 102 may automatically retrieve the multiple profiles and display the multiple profiles to the user. In response to the user selecting a particular profile from the multiple profiles, the computing device 102 may automatically configure the computing device 102 based on the selected profile.

The computing device 102 may determine a location of the computing device 102 based on the location data 128, the schedule 138, or both. In some cases, the user may specify (e.g., in a user profile or preferences file) whether the location data 128 supersedes the schedule 138 or whether the schedule 138 supersedes the location data 128. For example, if the user specifies that the location data 128 supersedes the schedule 138, the computing device 102 may attempt to determine the location of the computing device 102 based on the location data 128. In this example, if the computing device 102 is able to determine the location of the computing device 102 based on the location data 128, the computing device 102 may ignore the schedule 138. The computing device 102 may use the schedule 138 to determine the location of the computing device 102 only if the location data 128 is unavailable. As another example, if the user specifies that the schedule 138 supersedes the location data 128, the computing device 102 may attempt to determine the location of the computing device 102 based on the schedule 138. If the computing device 102 is able to determine the location of the computing device 102 based on the schedule 138, the computing device 102 may not determine (e.g., request) the location data 128. If the computing device 102 is unable to determine the location of the computing device 102 based on the schedule 138, computing device 102 may determine the location data 128 and use the location data 128 to determine the location.

The computing device 102 may include one or more software applications ("apps") 140 that are executable by the processors 114 to perform various functions. In some cases, each of the profiles 118 to 120 may include information about which of the applications 140 are to be enabled and/or disabled in a particular location. For example, a profile for a location in which the computing device 102 connects to an unsecured network (e.g., a public network) may include instructions to disable applications that communicate sensitive data. To illustrate, applications that communicate confidential data, such as banking or shopping applications, may be disabled for locations in which the computing device 102 connects to an unsecured network. As another example, in locations where both an unsecured network and a secure network are available, the user may configure access to both the networks using split routing to provide secure transactions while reducing the costs associated with network usage. As used herein, split routing refers to routing certain types of data via a first network while substantially simultaneously (e.g., substantially contemporaneously) routing other types of data via a second network. For example, assume the first network 106 is a secure network (e.g., a cellular network) which the user pays to access while the second network 108 is an unsecured network (e. g., public WiFi) which is available at a lower cost relative to the cellular network. Assume that both the networks 106 and 108 are available at the first location 110 or the second location 112. The profile associated with the location may configure the computing device 102 to use split routing, in which applications that communicate confidential data (e. g., financial information, such as banking information or credit card information) communicate using the secure network (e.g., a cellular network or a secured WiFi network) while applications that do not communicate confidential data use the unsecured network (e. g., an unsecured WiFi network or a network With an unknown security).

The applications 140 may include an application that provides voice-calling (and text messaging) across more than one type of network. For example, the calling application may be capable of providing voice calls (and text messages) over a WiFi or other type of network. To illustrate, the user may subscribe to cellular service from a cellular service provider. The cellular service provider may provide an application that enables voice calls (or text messages) to be made using a WiFi network with all the features of the cellular network. For example, the calling application may enable the user to originate calls (or send text messages) that appear to originate from the user's cellular phone number and receive calls (or text messages) made to the user's cellular phone number. The calling application may enable the user to seamlessly use features of the cellular network, such as storing and retrieving voice mail messages from a voice mail box provide by cellular service provider. Thus, the application may enable the user to seamlessly use at least some of the features of the cellular network on other types of networks, such as WiFi networks, in a way that is transparent to the user, to the recipients of communications originated by the user, and to the originators of communications to the user.

Thus, the computing device 102 may configure the computing device 102 using profiles (e.g., the profiles 118 to 120) associated with configurations of the computing device 102. The profiles may be used to configure the computing device 102 to connect to a particular network at a particular location. Once a profile associated with the location has been saved, the processors 114 may automatically configure the computing device 102 when the processors 114 determine that the computing device 102 is located in a location that has an associated profile. For example, when the processors 114 determine that the computing device 102 is located in the first location 110, the computing device 102 may be configured to connect to the first network 106. The location of the computing device 102 may be determined based on location data 128, the schedule 138, or combination of both. If more than one profile is associated with a particular location, the profiles associated with the location may be displayed to enable the user to select from the displayed profiles. In this way, the user may avoid repeatedly configuring the computing device 102 each time the user is in a particular location to connect to a particular network.

Figure 2:
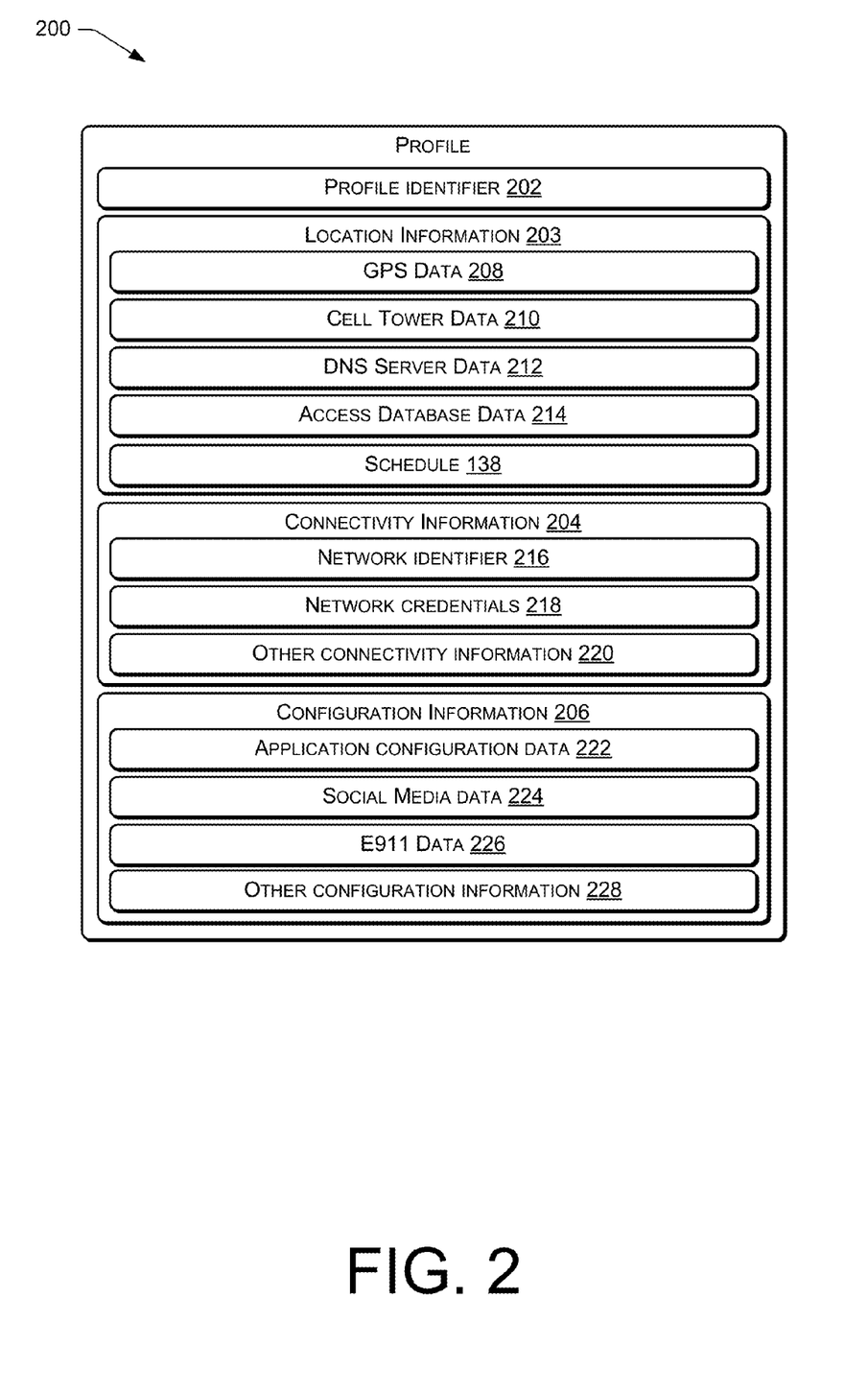
FIG. 2 is a block diagram illustrating a profile according to some implementations.

FIG. 2 is a block diagram illustrating a profile 200 according to some implementations. For example, the N profiles 118 to 120 of FIG. 1 may include the profile 200. The profile 200 provides examples of various types of data that may be included in the N profiles 118 to 120 and is not intended to be exhaustive. For example, in some implementations, the profile 200 may include other data in addition to or instead of the various data illustrated in FIG. 2.

The profile 200 may include a profile identifier 202. The profile identifier 202 may be specified by a user. Examples of a profile identifier may include "home WiFi network," "work WiFi network," "WiFi network of coffee shop on first floor," or "cellular network."

The profile 200 may include location information 203, connectivity information 204, and configuration information 206. The location information 203 may include data received from various sources described in FIG. 1, such as GPS data 208 received from the GPS 130, cell tower data 210 received from the cell towers 132, DNS server data 212 received from the DNS server 136, access database data 214 from the database 134, and/or the schedule 138. For example, the schedule 138 may specify a location where the computing device 102 of FIG. 1 may be located at different time periods on different days. For example, the schedule 138 may specify that the computing device 102 may be located in a coffee shop or restaurant from 7:00 AM to 7:59 AM, in a workplace from 8:00 AM to 5:00 PM, and in the user's home (e.g., house or apartment) the rest of the time.

The connectivity information 204 may include information associated with connecting to a network, such as one of the networks 106 or 108 of FIG. 1. For example, the connectivity information 204 may include a network identifier 216 (e.g., an SSID or other type of network identifier), network credentials 218 (e.g., a password and/or a username), or other connectivity information 220 (e.g., split routing information). The split routing information may be used to route certain types of data (e.g., sensitive data, such as banking information or credit card information) via a secure network while routing other types of data via an unsecure network. Split routing may reduce the cost of accessing the secure network by using the secure network for communications that benefit from being routed over the secure network while routing other communications over an unsecured network that has lower costs than the secured network.

The configuration information 206 may include application configuration data 222, social media data 224, E911 data 226, and other configuration information 228. For example, the application configuration data 222 may specify which of the applications 140 to enable and which of the applications 140 to disable at a particular location. The social media data 224 may be used by the processors 114 to automatically send a notification to one or more social media sites to indicate that the user is currently at a particular location (e.g., "John has arrived at the coffee shop on Sixth Street at 7:30 AM on Tuesday, Mar. 8, 2013").

The E911 data 226 may include location information to assist responders to a 911 call to accurately determine the location of the computing device 102. For example, if the computing device 102 is used to place a 911 call, the responders may use the E911 data 226 to locate and assist the caller.

The other configuration information 228 may include other data used to configure the computing device 102. For example, when the computing device 102 is located in a particular location (e.g., a movie theater, a church, a library, etc.) where silent operation is requested, the profile 200 may be used to configure the computing device 102 to a silent mode, in which a ringer volume is reduced or turned off, a vibrate mode is set, or the like.

Thus, when a mobile device (e.g., the computing device 102) is located at a location that has an associated profile (e.g., the profile 200), the mobile device may be automatically configured based on the profile. For example, the mobile device may be configured to connect to a particular network, enable and/or disable specified applications, send notifications to social network sites, etc.

Example Processes

Figure 3:
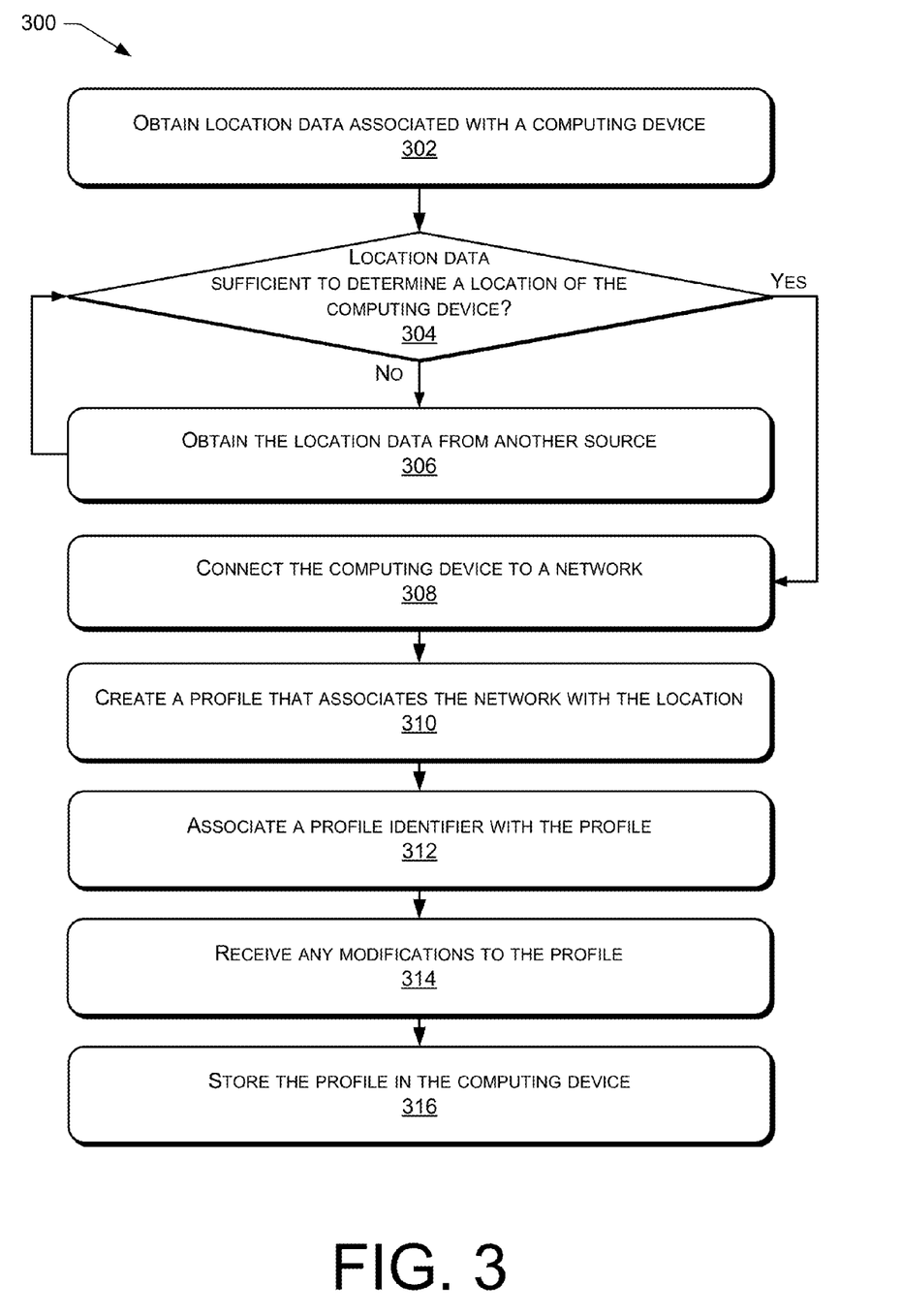
FIG. 3 is a flow diagram of an example process that includes adding a profile associated with a location according to some implementations.
Figure 4:
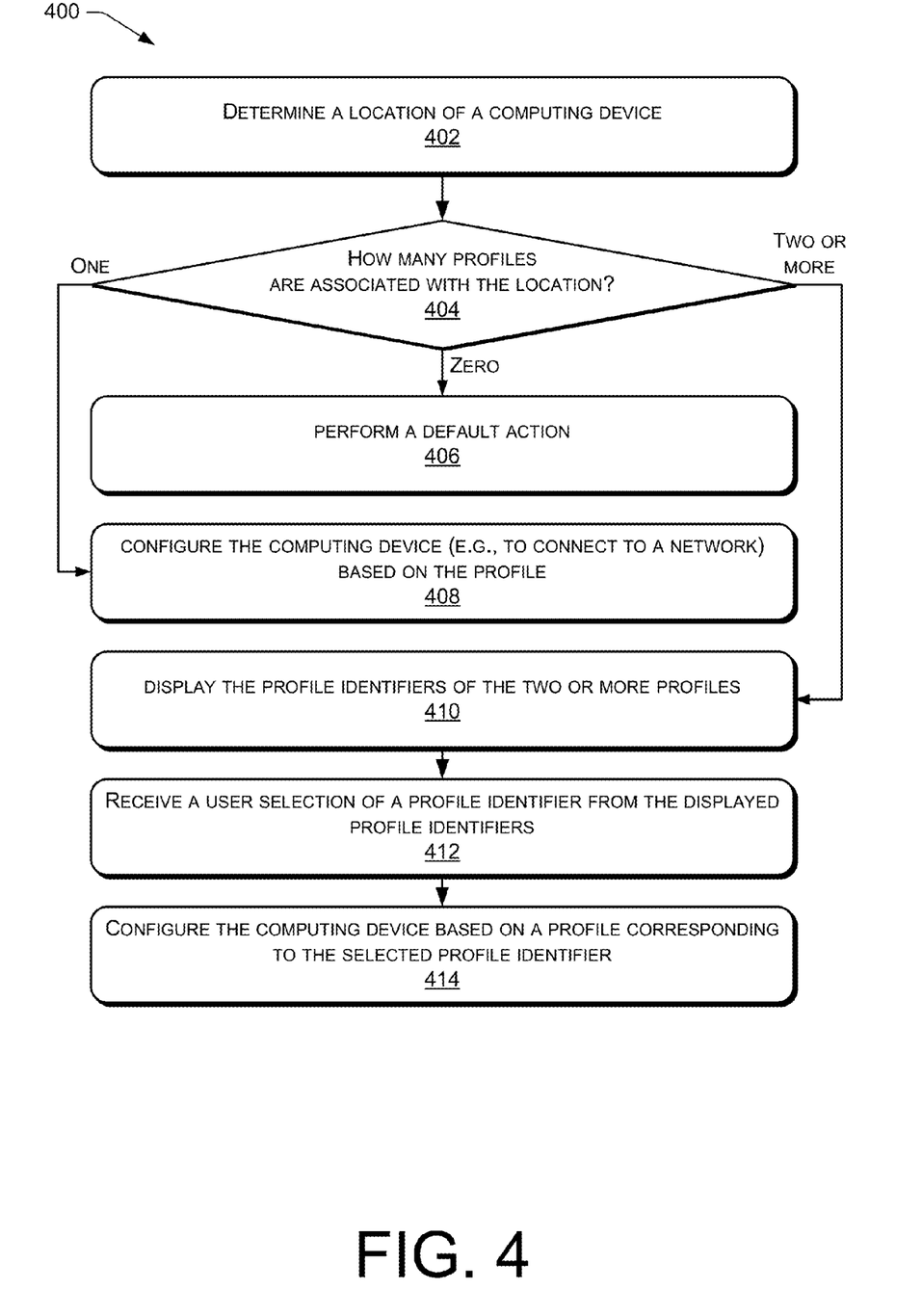
FIG. 4 is a flow diagram of an example process that includes configuring a computing device based on a profile associated with a location according to some implementations.
Figure 5:
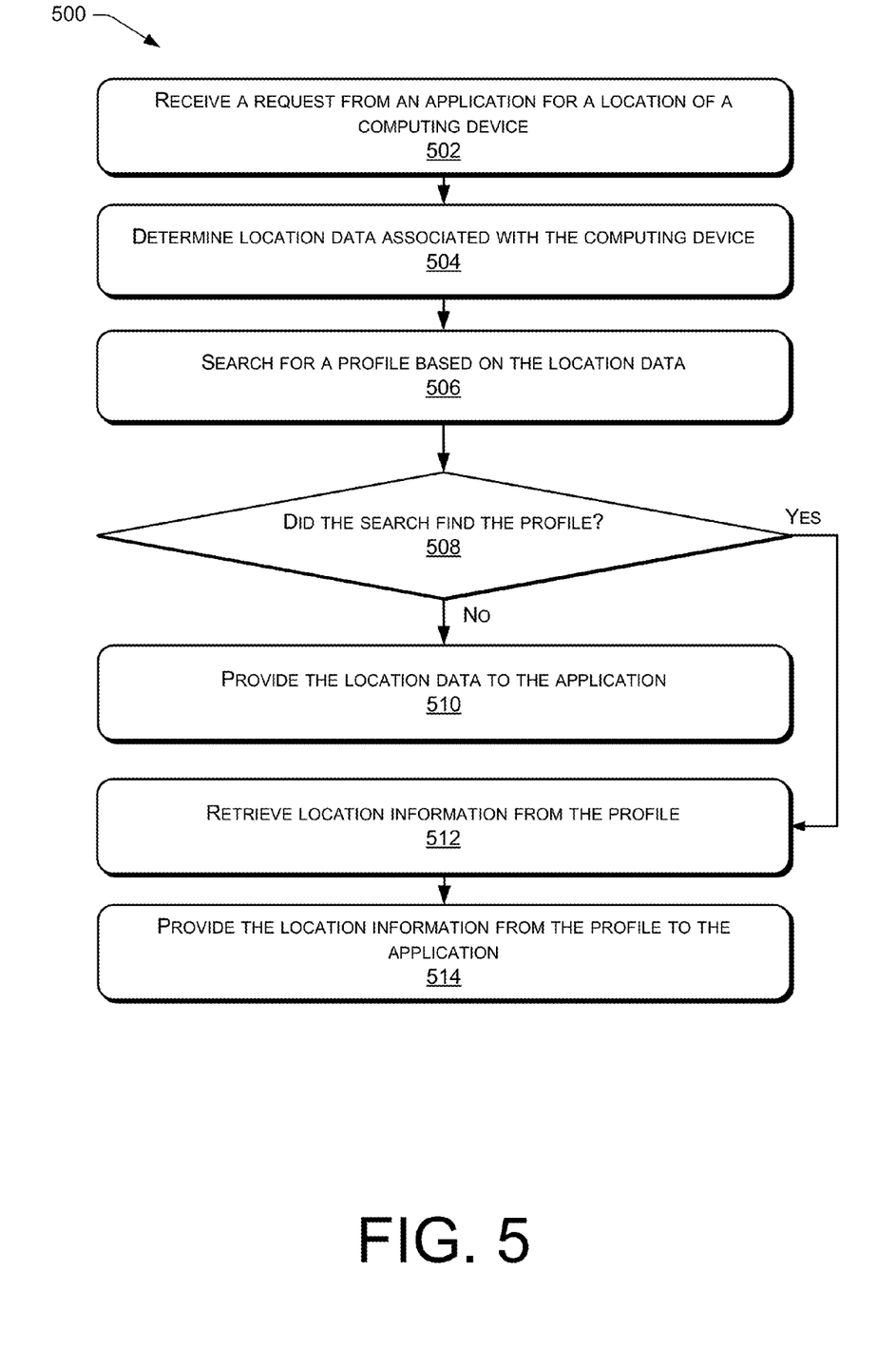
FIG. 5 is a flow diagram of an example process that includes finding a profile associated with a location according to some implementations.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to the architectures 100 and 200 as described above, although other models, frameworks, systems and environments may implement these processes.

FIG. 3 is a flow diagram of an example process 300 that includes adding a profile associated with a location according to some implementations. The process 300 may be performed by the computing device 102 of FIG. 1. The process 300 illustrates a how a user may create a profile associated with a location that includes connecting to a particular network.

At 302, location data associated with a computing device may be obtained. For example, in FIG. 1, the computing device 102 may obtain the location data 128 from a source, such as the GPS 130, the cell towers 132, the database 134, or the DNS server 136.

At 304, a determination may be made whether the location data is sufficient to determine a location of the computing device. If a determination is made that the location data is insufficient to determine the location of the computing device, at 304, then the location data may be obtained from another source, at 306, and the process may proceed back to 304. For example, in FIG. 1, the computing device 102 may determine whether the location data 128 is sufficient to accurately determine a location of the computing device 102. If the location data 128 is insufficient to determine a location of the computing device 102, the computing device 102 may obtain additional location data from another source. For example, the computing device 102 may determine the location data 128 from the GPS 130 and then use the cell towers 132 or the database 134 to obtain additional location data to determine a location of the computing device. If the sources 130, 132, 134, 136, or 138 are unable to provide sufficiently accurate location data, the user may be asked to input location data.

If a determination is made that the location data is sufficient to determine the location of the computing device, at 304, then the computing device may be connected to a network, at 308. For example, in FIG. 1, the computing device 102 may connect to a network, such as the first network 106 or the second network 108.

At 310, a profile may be created that associates the network with the location. For example, in FIG. 1, the user may create the first profile 118 in which the first location 110 is associated with connecting to the first network 106. As another example, the user may create the Nth profile 120 in which the second location 112 is associated with connecting to the second network 108.

At 312, a profile identifier may be associated with the profile. At 314, modifications to the profile may be received. For example, in FIG. 2, the user may edit (e.g., modify) the profile 200 and the edits may include adding the profile identifier 202 to the profile 200.

At 316, the profile may be stored in the computing device. For example, in FIG. 1, after creating one of the N profiles 118 to 120, the profile may be stored in the computer readable medium 116 of the computing device 102.

Thus, a user may take a computing device, such as a mobile phone, to a location. The computing device may determine a current location of the computing device. The user may configure the computing device, including connecting to a network. The user may create and save a profile that associates the configuration, including the network connection, with the location. When the computing device is subsequently moved to the same location, the computing device may automatically determine the location, identify the associated profile, and configure the computing device based on the profile to connect to the network. Thus, the location of the computing device may be used to identify a corresponding profile and configure the computing device based on the corresponding profile.

FIG. 4 is a flow diagram of an example process 400 that includes configuring a computing device based on a profile associated with a location according to some implementations. The process 400 may be performed by the computing device 102 of FIG. 1. The process 400 illustrates how moving a computing device to a location may trigger a corresponding profile that automatically configures the computing device. Configuring the computing device may include connecting to a network specified in the profile (e.g., using credentials specified in the profile).

At 402, a location of a computing device may be determined. For example, in FIG. 1, the computing device 102 may determine that the computing device 102 is located in the first location 110 or the second location 112 after obtaining the location data 128 from one or more of the GPS 130, the cell towers 132, the database 134, or the DNS server 136.

At 404, a determination may be made as to how many profiles are associated with the location. For example, the computing device 102 may determine whether the location data 128 of FIG. 1 matches the location information 203 of FIG. 2, in each of the N profiles 118 to 120.

If a determination is made that zero profiles are associated with the location, at 404, then a default action may be performed, at 406. For example, the default action may include taking no further action, prompting the user to add a profile for the location, or displaying at least some of the N profiles 116 to 118 and prompting the user to select one of the previously created profiles.

If a determination is made that one profile is associated with the location, at 404, then the computing device may be configured based on the profile, at 408. For example, in FIG. 1, if the Nth profile 120 is associated with the first location 110 and the computing device 102 is determined to be located in the first location 110, the processors 114 may configure the computing device 102 based on the Nth profile 120.

If a determination is made that two or more profiles are associated with the location, at 404, then the profile identifiers of the two or more profiles may be displayed, at 410. For example, the user may frequent a coffee shop in a building and work in an adjacent building (or a different floor of the same building). In this example, a coffee shop profile associated with the coffee shop and a work profile associated with the workplace may both be associated with the same location due to the proximity of the buildings and the granularity of the location data. The computing device 102 may determine that both the coffee shop profile and the work profile are associated with a current location (e.g., the first location 110) of the computing device 102. The computing device 102 may display the profile identifiers of the corresponding profiles, e.g., "coffee shop network profile" and "work network profile" to enable the user to select from the profiles. After receiving a user selection selecting one of the displayed profiles, the computing device 102 may configure the computing device 102, including connecting to a network, based on the selected profile.

In some cases, the computing device 102 may use a schedule (e.g., the schedule 138 of FIG. 1) to automatically select from multiple profiles associated with a same location. For example, when the coffee shop's network is in close proximity to the workplace network, the computing device 102 may identify the "coffee shop network profile" and the "work network profile" as being associated with a current location of the computing device 102. Using the schedule 138, the computing device 102 may select one of the profiles from the profiles associated with the location.

Thus, after creating a profile for a configuration of a computing device that includes connecting to a network at a particular location, the computing device may be automatically configured using the profile when the computing device is subsequently located at the particular location. Where two or more networks are available at the same location, the profile may be used to enable split routing, in which confidential data may be sent using a secured network while other types of data may be sent using an unsecured (or unknown security) network. When two or more profiles are associated with the same location, the computing device may display the profiles associated with the location and enable the user to select from the profiles or the computing device may use a user provided schedule to select from the profiles based on a current time and date. In this way, after a user creates a profile for each of multiple locations, the computing device may automatically provide connectivity at each of the multiple locations, without the user doing any further configuring of the computing device. In addition, the profile may be used to automate various functions of the computing device, such as using an application to perform a particular task. For example, as the user approaches a coffee shop, the computing device may automatically place an order for a tall latte such that the tall latte is ready by the time user enters the coffee shop. In addition to placing the order, the computing device may also connect to a network provided by the coffee shop and use an application to notify friends that the user is in the vicinity of the coffee shop. For example, the application may send a text message, email, or other type of notification to specific friends of the user. As another example, the application may send a notification to a social networking site to post that the user is in the vicinity of the coffee shop to enable friends who are nearby to meet with the user.

FIG. 5 is a flow diagram of an example process 500 that includes finding a profile associated with a location according to some implementations. The process 500 may be performed by the computing device 102 of FIG. 1. The process 500 illustrates how an application (e.g., one of the applications 140 of FIG. 1) executing on a computing device may obtain location information.

At 502, a request for a location of a computing device may be received from an application. For example, in FIG. 1, an application executing on the computing device 102 may send a request to the processors 114 to provide a location of the computing device 102.

At 504, location data associated with the computing device may be determined. For example, in FIG. 1, the processors 114 may obtain the location data 128 from one or more of the GPS 130, the cell towers 132, the database 134, or the DNS server 136.

At 506, a search for profiles may be performed based on the location data. For example, in FIG. 1, the processors 114 may perform a search to determine whether location information (e.g., the location information 203 of FIG. 2) in the N profiles 118 to 120 matches the location data 128.

At 508, a determination may be made whether the search found a profile. If a determination is made that the search did not find a profile, at 508, then the location data may be provided to the application, at 510. For example, in FIG. 1, if the processors 114 determine that none of the N profiles 118 to 120 match the location data 128 (e.g., a profile is not associated with the current location of the computing device 102), then the location data 128 may be provided to the application.

If a determination is made that the search found a profile, at 508, then location information may be retrieved from the profile, at 512. At 514, the location information from the profile may be provided to the application. For example, if the processors 114 determine that one of the N profiles 118 to 120 match the location data 128, then the processors 114 may retrieve location information (e.g., the location information 203 of FIG. 2) from the matching profile and provide the location information retrieved from the profile to the application. For example, the location information from the profile may provide more precise location information relative to the location data 128. For example, the location data 128 may identify a location to with a city block, while the profile information may identify the location as a coffee shop in a particular location within the city block. The more precise location information from the profile may enable location based services to be provided to the user. For example, in response to determining that the computing device is located in a restaurant or shop, the user may be provided with an incentive (e.g., a coupon) to initiate a transaction (e.g., a purchase).

Thus, if a profile is associated with a current location, location information from the profile may be provided to applications that request information about the current location of the computing device. If a profile is not associated with the current location, location data obtained from one or more sources may be provided to the applications.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer readable media storing instructions that are executable by one or more processors to perform acts comprising:
   obtaining location data from a user-provided schedule stored locally on a computing device;
   determining that the computing device is located proximate a first location and a second location based at least in part on the location data;
   in response to determining that the computing device is located proximate the first location and the second location, configuring the computing device using a first profile of a plurality of profiles to connect to a first network and a second profile of the plurality of profiles to connect to a second network, wherein different ones of the plurality of profiles are associated with different locations and different networks;
   displaying a first profile identifier associated with the first profile and a second profile identifier associated with the second profile;
   receiving a user selection of the first profile identifier or the second profile identifier; and
   configuring the computing device to connect to the first network or the second network based on the user selection.

2. The one or more non-transitory computer readable media of claim 1, wherein a user-provided schedule comprises at least one period of time that is associated with the first location.

3. The one or more non-transitory computer readable media of claim 1, wherein configuring the computing device includes one or more of configuring at least one application, sending a notification message that includes the location to a social networking site, or sending a text message that includes the location to one or more recipients.

4. The one or more non-transitory computer readable media of claim 1, the acts further comprising:
   in response to determining that the computing device is located at the second location, configuring the computing device using the second profile to connect to the second network.

5. The one or more non-transitory computer readable media of claim 1, wherein determining that the computing device is located at the first location further comprises:
   obtaining additional location data from one or more of global positioning satellites, multiple cell towers, a database of locations of network access points, or a domain name system (DNS) server associated with the first network; and
   determining the location based on the location data and on the additional location data.

6. The one or more non-transitory computer readable media of claim 1, wherein the first profile includes enhanced 911 (E911) information associated with the first location.

7. The one or more non-transitory computer readable media of claim 1, wherein the first profile includes a network identifier and network credentials to enable the computing device to connect to the first network.

8. The one or more non-transitory computer readable media of claim 1, wherein obtaining location data from the user-provided schedule further comprises:
   determining a current time and date; and
   determining that a user-provided schedule includes an entry for the current time and date.

9. A method, comprising:
   under control of one or more processors configured with instructions to perform acts comprising:
      determining that a current location of a computing device is within a predetermined distance from both a first location and a second location, the first location being associated with a first profile which includes network information for a first network and the second location being associated with a second profile which includes network information for a second network;
      connecting to the first network, wherein the first network is a secure network;
      connecting to the second network, wherein the second network is an unsecure network;
      sending data using split routing, split routing comprising:
         sending confidential data using the first network; and
         sending non-confidential data using the second network.

10. The method of claim 9, wherein:
   the confidential data is sent using the first network substantially contemporaneously with sending the non-confidential data using the second network.

11. The method of claim 9, further comprising:
   disconnecting from the first network after sending the confidential data.

12. A method, comprising:
   under control of one or more processors configured with instructions to perform acts comprising:
      determining that a current location of a computing device is within a predetermined distance from a first location; a second location, and a third location, the first location being associated with a first profile which includes network information for a first network, the second location being associated with a second profile which includes network information for a second network, and the third location being associated with a third profile which includes network information for a third network;
      in response to determining that the current location of the computing device is within the predetermined distance from the first location, the second location, and the third location, obtaining location data from a user-provided schedule stored locally on the computing device;
      automatically selecting the first profile, the second profile, or the third profile based on the current location and the location data from the user-provided schedule without input from the user; and
      configuring the computing device based on the current location and the location data from the user-provided schedule to connect to the first network, the second network, or the third network.

13. The method of claim 12, the acts further comprising:
receiving a request from an application to provide the current location of the computing device;
obtaining location data from one or more sources;
determining the current location based on the location data; and
in response to determining that one or more profiles associated with the computing device include a location that is within a predetermined distance from the current location, providing the location included in at least one profile of the one or more profiles to the application.

14. The method of claim 13, the acts further comprising:
in response to determining that the one or more profiles associated with the computing device exclude locations that are within a predetermined distance from the current location, providing the location data to the application.

15. The method of claim 12, wherein determining that the computing device is located at the first location comprises:
determining a current time and date; and
determining that a user provided schedule includes the first location at the current time and date.

16. The method of claim 12, further comprising:
in response to determining that a current location of the computing device is within a predetermined distance from the first location, the second location, and the third location, displaying a first profile identifier associated with the first profile, a second profile identifier associated with the second profile, and a third profile identifier associated with the third profile;
receiving a user selection of the first profile identifier, the second profile identifier, or the third profile identifier; and
configuring the computing device to connect to the first network, the second network, or the third network based on the user selection.

17. The method of claim 12, further comprising:
obtaining additional location data from one or more of global positioning satellites, multiple cell towers, a database of locations of network access points, or a domain name system (DNS) server associated with the first network; and
determining the location based on the location data and on the additional location data.

18. The method of claim 12, wherein at least one of the first profile, the second profile, and the third profile include enhanced 911 (E911) information associated with the first location, the second location, or the third location, respectively.

* * * * *